April 3, 1956
C. H. PHELPS
2,740,297
BALANCE TESTING MEANS
Filed Oct. 11, 1951
3 Sheets-Sheet 1
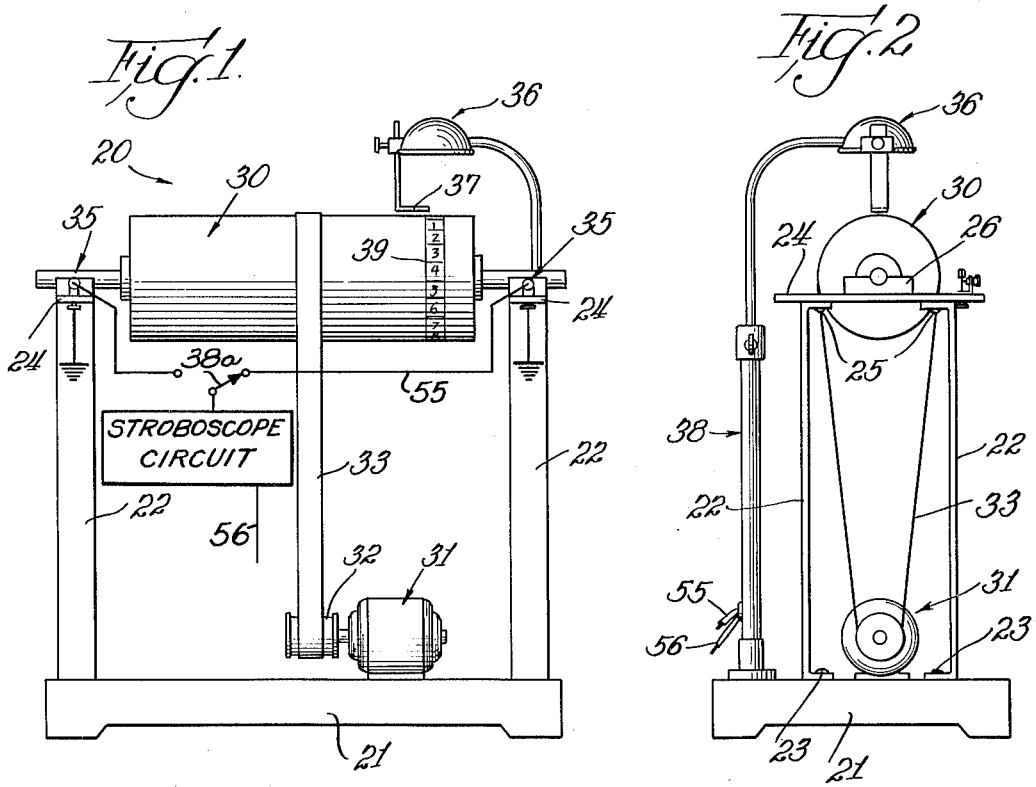
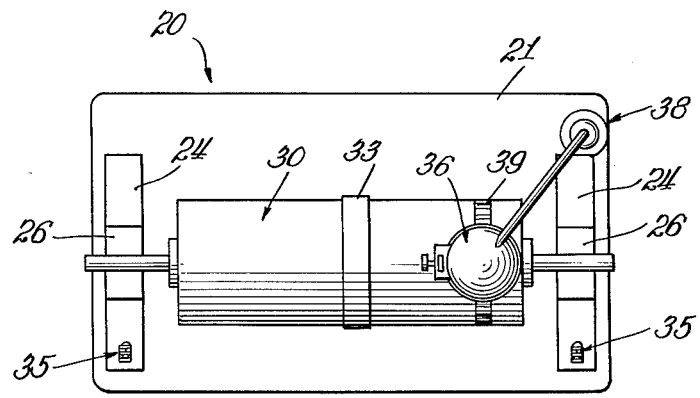
INVENTOR.
Clyde H. Phelps April 3, 1956   C. H. PHELPS   2,740,297
BALANCE TESTING MEANS
Filed Oct. 11, 1951   3 Sheets-Sheet 2

INVENTOR.
Clyde H. Phelps
BY
Brown, Jackson,
Boettcher & Dienner Attys.

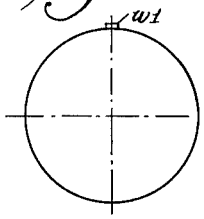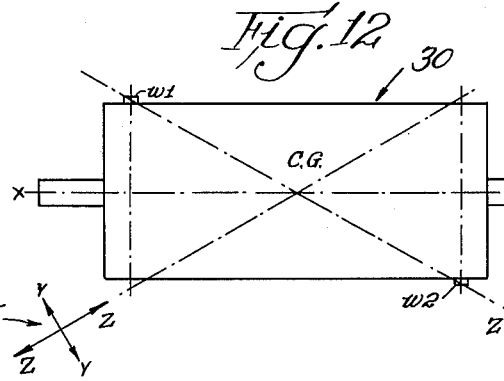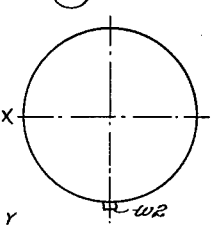
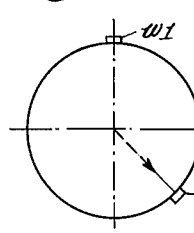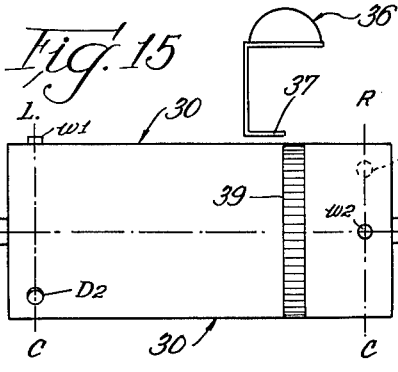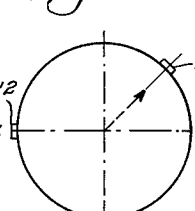
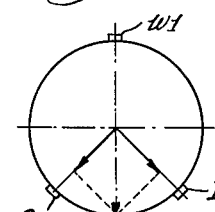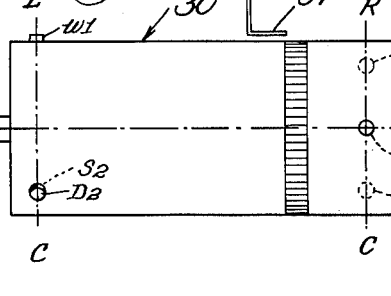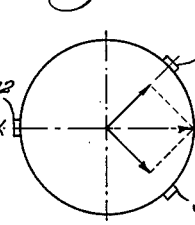
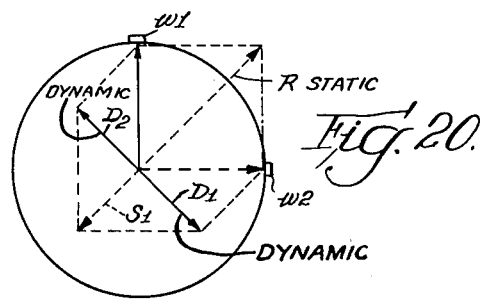

United States Patent Office 2,740,297
Patented Apr. 3, 1956

2,740,297

BALANCE TESTING MEANS

Clyde H. Phelps, Springfield, Ill., assignor, by mesne assignments, to Raydyne Corporation, Springfield, Ill., a corporation of Illinois Application October 11, 1951, Serial No. 250,863

4 Claims. (Cl. 73—466)

The present invention relates to determination of the weight distribution of a mass or rotor about its axis of rotation, with a view to bringing such mass into dynamic and static balance.

An essential concept of the present invention resides in the application of a vibration responsive device having a single plane of non-responsiveness to unbalance in a selected plane of the rotating mass which is so mounted as to be movable for vibratory motion, because of unbalance, in a single plane only.

The support or suspension for the rotor may take any one of a variety of specific forms of known or preferred types, such, for example, as a piano wire suspension or flexible steel columns or the like, the essential characteristic being that the rotor may vibrate freely in substantially a plane, which, in most cases, will be a horizontal plane. To support the rotor at each end for rotation, some form of bearing is employed, and these bearings are individually free to move in the said plane of free vibration under the influence of the mass when it is rotated and vibrates in said plane due to unbalance.

The vibration responsive device has the essential characteristic that it is non-responsive for unbalance in a single plane or zone, and it is preferably so mounted relative to the corresponding rotor support or bearing that its plane of non-responsiveness lies at right angles to the vibration plane of the rotor, and that the mechanical connection of the device to the selected part of the rotor (or a movable part that has a certain invariable relation thereto) is such as to permit rotary adjustment of the position of the device to bring the said plane of non-responsiveness into line with the point or center about which vibratory motion of the rotor occurs when the rotor is caused to vibrate, or to bring the said plane of non-responsiveness into a position of tangency with the arc of motion of said selected part of the rotor, or the said associated movable part, and normal to a line through the point or center about which said vibratory motion of the rotor occurs.

Since the point or center of oscillation in the plane of permitted rotor vibration may lie anywhere along the line of the axis of the rotor from negative infinity to positive infinity with reference to any selected point on said axis, the adjustable support for the vibration responsive device should permit angular adjustment through at least 180°.

Although it is preferable, from the standpoint of simplicity and ease of operation to dispose the vibration responsive device with its plane of non-responsiveness at right angles to the plane of permitted motion of the rotor, the axis of rotary adjustment of the responsive device may be other than normal to the plane of permitted vibratory motion of the rotor, so long as there is a sufficient component of the vibratory motion of the rotor effective on the vibration responsive device to permit the device's indication between maximum response and zero response for angular adjustment of its plane of non-responsiveness.

The point or center of rotation of the vibratory motion of the rotor will lie at infinity when the rotor has so-called pure static unbalance which will produce pure translatory movement in the selected plane of permitted vibration. Also in that case the arc of swing will be an arc of infinite radius, that is, a straight line. Hence, it can be seen that adjustment of the responsive device to bring its plane of non-responsiveness at right angles to the axis of the rotor having purely static unbalance will produce zero response of the responsive device.

When the rotor has solely dynamic unbalance, the point or center of oscillation will lie on the line of the rotor's rotational axis or the axis extended at some finite distance from a selected point on the axis, and in the latter case, the arc of swing will be on a finite radius, and the plane of non-responsiveness of the device to such vibratory motion will not be normal to the line of the axis of the rotor but will be normal to a line or plane passing through the center of rotational vibratory oscillation of the rotor.

The vibration responsive device preferably has a maximum response to vibrational excitement in a line normal to the plane of non-responsiveness. Hence, two positive indications will be available for different angular positions of the device, that is, zero response when the exciting vibrations have their arc or line of reciprocatory motion in the plane of non-responsiveness of the device, and maximum response for a position of the device where the plane of non-responsiveness is normal to the arc or line of motion of vibration.

The vibration responsive device may take a variety of specific forms, as will be apparent to those skilled in the art. Such device may be a mechanical indicator or a fluid operated indicator or electrical pickup with an appropriate circuit and electrical indicator. Such devices may also be utilized in connection with recording devices.

A wide variety of electrical pickup devices is available for the present purpose. The essential requirement is that the pickup have a single plane of non-responsiveness for vibration in that plane. Preferably such device should have a maximum responsiveness to vibrations occurring along a line (which may be a short segment of an arc) when that line or arc is normal to the plane of non-responsiveness.

One suitable form of device is a flat reed or spring anchored at one end and weighted at the other to tune it to a desired frequency relative to the vibration frequency of the rotor under test. The plane of non-responsiveness is the plane of the body of the spring. The direction of maximum responsiveness is along a line normal to the plane of the body of the spring. A measure of the amplitude of vibration for a given position of the non-responsive plane of the device may be obtained by either a make and break contact or by a pressure sensitive resistor which alters the resistance of a circuit or by a piezocrystal which generates impulses by the application of mechanical stress thereto. The vibration responsive device may operate on other electrical characteristics, such, for example, as capacity or inductance or various combinations of resistance capacity or inductance or by the generation of voltage in a circuit by mechanical motion. These criteria may be utilized to measure the degree of response, that is, to indicate amplitude of the exciting vibrations, and hence, the extent of unbalance of the rotor. The responsive device may have as its responsive element a diaphragm with means mechanical, electrical or otherwise, to indicate and magnify, if desired, the response of the diaphragm to vibrations imposed upon the device. The diaphragm may be tuned or untuned, preferably the former, since greater sensitivity is thereby obtained.

By the use of two such vibration responsive devices operated in respect of two correction planes, with an indicator or separate indicators graduated in terms of unbalance in said two correction planes, a series of rotors intended to be alike, quickly and conveniently may be analyzed for weight distribution and then may be brought to balance. The simplicity of operation and speed and accuracy of analysis of the weight distribution of the rotor upon its axis of rotation marks my present device as a great advance in the art. The simplicity and ruggedness of the present responsive device over devices of the prior art is pronounced. The new theory of operation underlying the aforesaid improvement in structure and its mode of operation to effect a balancing of a rotating mass of unknown weight distribution characteristics is the basis of the present invention.

In particular I propose to demonstrate a new and improved means whereby a rotating mass of unknown weight distribution characteristics may be brought into perfect balance by individually isolating and separately counteracting the unbalancing forces creating static and dynamic unbalance rather than hunting hit and miss for their combined effects which is the basis of present day practice in the art.

Now in order to acquaint those skilled in the art with the manner of constructing and operating a device in accordance with my invention I shall describe, in connection with the accompanying drawings, a specific embodiment of the same and of the mode of use thereof.

In the drawings:

Figure 1 is a front elevational view schematically demonstrating a balancing machine embodying the essential features of my invention;

Figure 2 is an end elevational view of the machine shown in Figure 1;

Figure 3 is a top plan view of the machine shown in Figures 1 and 2;

Figure 4:
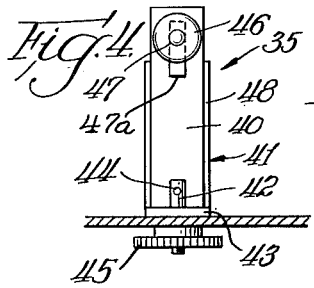
Figure 4 is a front elevational view of my new and improved vibration responsive device utilized for indicating the unbalance of a rotating mass in conjunction with the machine of Figures 1–3.

Figures 8 through 19 are diagrammatic representations of a rotor to be balanced showing various unbalance conditions thereof and the mode of correcting such unbalance according to my invention; and Figure 20 is a composite vector diagrammatic analysis of the forces of unbalance present in a rotor or rotating mass having both static and dynamic unbalance; the vector representations at both ends or at both correction planes of the rotor being shown in superposed or composite relation.

*Testing means*

Referring now to Figures 1–3 of the drawings, it will be recognized that a familiar type of balancing machine 20 is illustrated therein comprising a suitable ground engaging base 21 to which are anchored four vertical supports 22. The supports 22 are arranged in pairs, one pair adjacent each end of the base member 21, with the individual supports of each pair arranged in spaced, parallel, vertical relation. Supports 22 are of a flexible nature and herein consist of rectangular strips of spring steel of sufficient strength to support a desired vertical load, but resilient enough so that they may flex freely from side to side about their anchored lower ends 23. Transfixed across the upper ends of each pair of supports 22 is a bearing carriage support 24, consisting of a substantially rectangular metal bar. Suitable connection with each of the carriage supports 24 and the upper ends of the paired flexible supports 22 is accomplished by means of screws, bolts, welding or like means, as at 25, to maintain the supports 22 in spaced parallel relation at all times. Mounted atop each of the bearing carriage supports 24 is a bearing carriage member 26 consisting of a metal block or the like formed suitable for rotatably supporting and bearing the load of a rotor or rotating mass 30 which is to be balanced. It will be noted that with the structure described so far the rotor is supported at opposite ends of its central axle for rotation in the two bearing carriage members 26 with the rotor being limited in its movements, other than rotational about its own longitudinal axis, to a single horizontal plane of permissible vibratory movement passing centrally through the bearing carriage members 26.

Means for rotating the rotor 30 comprise an electrically energized motor 31 secured to the base member 21. The motor 31 drives a pulley wheel 32 which in turn frictionally engages and drives a belt 33 trained around the body of the rotor 30.

Means for indicating the amount and type of unbalance in each of two selected balance correction planes comprise a pair of my vibration responsive indicators 35, one of which is mounted on each of the bearing carriage supports 24 for movement therewith so as to lie transversely of the plane of permissible vibratory movement but movable thereacross. Further, the indicator is designed to turn or rotate about its vertical axis to permit its rotational adjustment through at least 180° for purposes which will appear later.

Means for indicating the angular disposition of the unbalancing forces is provided in the form of a conventional stroboscope lamp 36 provided with a suitable indicator pointer 37; the lamp being secured to the base of the machine by a suitable standard 38. The lamp 36 is energized by means of a conventional stroboscope circuit of the order shown, for example, in the patent to J. O. Mesa, 2,616,288 issued on November 4, 1952. Such circuit is controlled by either of the indicator devices 35 of my invention which are selectively employed as by means of a selector switch 38a or the like (see Figure 1). A removable index numeral band 39 is also provided and is to be mounted about the rotor body, substantially as illustrated, for use in conjunction with the stroboscope lamp to indicate the angular disposition of the unbalancing forces, according to conventional practice.

It will be recognized that the type of balancing machine just described is conventional and known in the art and may assume other structural forms and embody other means for supporting the rotor and restricting the same to a single plane of permissible vibratory movement. For example, a pair of strong wires having suitable bearing means at the lower ends may be substituted for the flexible supports 22 to suspend and support the rotor while limiting its freedom of movement substantially to a single horizontal plane, as desired. However, the use and features of my vibration responsive indicators 35 constitute an advanced step over the prior art and gives rise to a new and improved method, embodying heretofore unpracticed principles for balancing in a positive and definite manner, a rotating mass having unknown mass distribution characteristics. For purposes of illustration, I have shown one form of the indicator 35 in which the principles of my vibration responsive indicator may appear.

Figure 5:
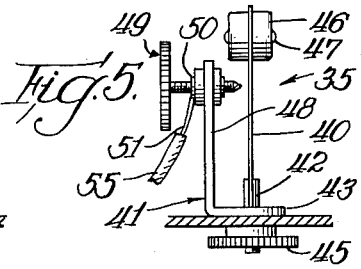
Figure 5 is an end elevational view of the device shown in Figure 4.
Figure 6:
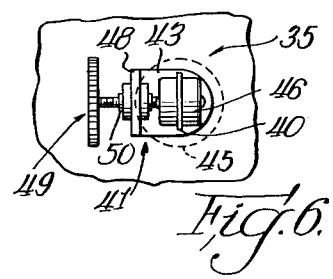
Figure 6 is a top plan view of the device shown in Figures 4 and 5.

Referring specifically to Figures 4–6 of the drawings, it will be recognized that I have shown perhaps the simplest form which a device having an inherent plane or zone of non-responsiveness to vibration may assume. It will be observed that the indicator 35 illustrated, comprises a flat flexible spring or reed 40 which inherently will not vibrate in its own plane of formation, but is free to vibrate from forces acting in any plane other than its own plane of formation. The spring 40 is supported suitably at one end by an angle frame 41 having a retaining split post 42 projecting outwardly from its base portion 43. The split post 42 insertedly receives one end of the spring leaf 40 and is rigidly tied thereto as by a rivet 44. Post 42 also extends through base 43, is threaded at its outer end and receives a knurled retaining or mounting nut 45 thereon for securing the indicator transversely to a bearing carriage support 24. The outer or free end of spring 40 is provided with an inertia weight or mass 46 which is adjustably mounted on the spring by means of a transversely extending bolt 47 received in a slotted aperture 47a of the spring reed 40 or by other suitable means, for movement to selected positions along the length of the spring to regulate the natural period of vibration of the spring and weight system.

Frame 41 is also provided with an arm 48 which extends along one side of the spring 40 parallel to the plane of the latter. Through arm 48 is threadingly mounted a value screw 49, which threadingly moves through a non conductor bushing member 50 which insulates screw 49 from frame 41. The value screw is provided with a suitably graduated index scale on its outer face (not illustrated) which, in conjunction with an index reference mark (not shown) on arm 48 enables one to determine the exact value of the screw movement toward and away from the at rest position of the spring or reed 40. A connective terminal 51 also contacts screw 49 and is secured to bushing 50. The terminal 51 is connected in electrical circuit with a terminal conductor 55 associated in circuit with the stroboscope lamp 36. A second terminal conductor 56 of the stroboscope lamps circuit connects the lamp with a source of electrical potential; the circuit to the lamp being completed through ground. The entire indicator (frame 41, spring 40 etc.), is also connected to ground with the exception of the insulated value screw 49.

Thus it will be recognized that when spring 40 is set in motion in the presence of a vibratory force it moves toward and away from the end of screw 49. By threadingly adjusting the distance between the spring and the end of the value screw, a point of adjustment may be found where the screw and spring make contact exactly at the end of the spring's arc movement toward the screw. At that instant of contact the electrical circuit through the stroboscope lamp 36 will be completed through the screw 49 and conductor 55 to ground causing a single flash of the lamp 36. The point at which the screw 49 and spring 40 contact, when the latter is swinging at its maximum amplitude, occurs when the amplitude of vibration of the unbalanced rotor is at a maximum in one direction. Therefore, the amount which the screw 49 has been adjusted away from spring 40 to just contact the latter at the end of its arcuate swing is a measure of the amplitude of motion between the spring and screw, and is proportional to the unbalancing force causing the spring to vibrate.

In this connection it should be pointed out that the relative movement of the spring-weight system of my indicator means may be either in phase or out of phase with the motion of the unbalanced rotor, or the R. P. M. of the rotor may equal the natural period of the spring-weight system of the indicator, in which case the relative motion between the spring-weight system and that of the unbalanced rotor will have a 90° phase differential. If the rotor is rotated at a speed below the natural vibration period of the spring-weight systems, the two will be in phase. If the rotor's R. P. M. equals the natural vibration period of the spring-weight system, the two will be 90° out of phase while the motion of the indicator frame 41 will be resonant with the maximum motion of the spring-weight system. This condition above resonance occurs when the inertia mass 46 is substantially at rest in the earth's gravitational field while the frame 41 with the attached screw 49 is in motion toward and away from spring 40 and the motion of the unbalanced rotor, in the plane of permissible vibratory motion, is out of phase with the spring-weight system.

From the above it will be appreciated that the rotor and spring-weight system may be operated above, below or at resonance, although the desirable operation is with the rotor running above the resonant point so that the spring-weight system and rotor motions are 180° out of phase.

Also to be considered in the operation of the balancing machine is the natural period of vibration of the leaf spring rotor mounting system. Desirably the rotor mounting system is constructed with a very low natural period of the vibration (less than 100 vibrations per minute) so that practically all operations of the machine and rotational speeds of the rotor are well above the natural period of the rotor mounting system.

Since the indicator spring-weight system is made with an adjustable period of natural vibration, either by selection of the spring or weight 46 or both, it is convenient to adjust the spring-weight system of the indicator so that all balancing operational speeds of the rotor are well above the natural period of vibration for the indicator system as well. Preferably all balancing operations are carried on at rotor speeds of rotation well above the natural vibration periods of both the spring-weight and rotor mounting systems, although the features of the balancing apparatus are such that it may be regulated to operate at conditions below or at the natural periods of those two systems if desired.

Thus it will be recognized that the indicator 35 described hereabove subscribes to the essential characteristics of a system having a plane or zone of non-response to vibration producing forces while it is free to vibrate in response to forces outside of such plane of non-response. This essential feature is also to be found in numerous other devices, as discussed heretofore, such as various commercial vibration pick-up systems of a mechanical or electrical nature capable of indicating the amplitude of a vibration producing force and having a zone or area of non-response.

*Use and operation*

Having thus set forth the features of one form of balancing machine or apparatus with which a vibration responsive indicator, embodying the principles of my invention, may be utilized to practice my new and improved method of balancing a rotating mass of unknown weight distribution characteristics, I will now describe the mode of operating the balancing machine and vibration responsive device, as illustrated, and the principles involved in my new and improved method of balancing.

In contemplating the principles of balancing a mass of unknown weight distribution characteristics as I am about to disclose, it is well to note that generally speaking the prior art efforts in this balancing art have been directed to balancing systems, electrical, mechanical, or a combination of the two, in which a first trial and error mode of balancing, directed to the resultant effects of static and dynamic unbalance, is essential prior to the determination of the value and separate effect of the individual static or dynamic forces creating such combined effects. Normally such a trial and error operation is carried on with the initial article of a series of similar articles to be balanced or may be applied to a unique article, this by adding or subtracting weights in a pair of selected planes of balance until eventually the combined effects of the dynamic and static forces creating the unbalancing motion of such an article are counterbalanced. This method is slow, inaccurate and subject to much guess-work.

In contrast to such prior art efforts, my present mode of operation and method of balancing, contemplates the selective and individual determination of the separate static and dynamic forces of unbalance; each being individually determined irrespective of the other force. With this theory of operation in mind, it will therefore be recognized that having once determined the individual static and dynamic forces causing the combined unbalance, their individual effects may be eliminated to bring the rotating mass into complete balance. Briefly, the underlying concept of my invention appears in the discovery that if an indicator is available which is responsive either to static forces alone or to dynamic forces alone irrespective of the presence of the other unbalancing force, the article to be balanced then may be corrected as to pure static and pure dynamic unbalance, one at a time, to gain complete balance. For example, I propose to first counteract the unbalance due to dynamic forces or forces causing rotation of the mass in the single plane of permissible movement and then the unbalance created by the static forces or that is, the forces causing the mass to translate or rectilinearly reciprocate bodily across or in the said plane of the permissible movement. Having individually brought the two separate components, namely dynamic and static unbalancing forces or effects, into adjustment, the rotor or unbalanced mass will be completely balanced.

Figure 7:
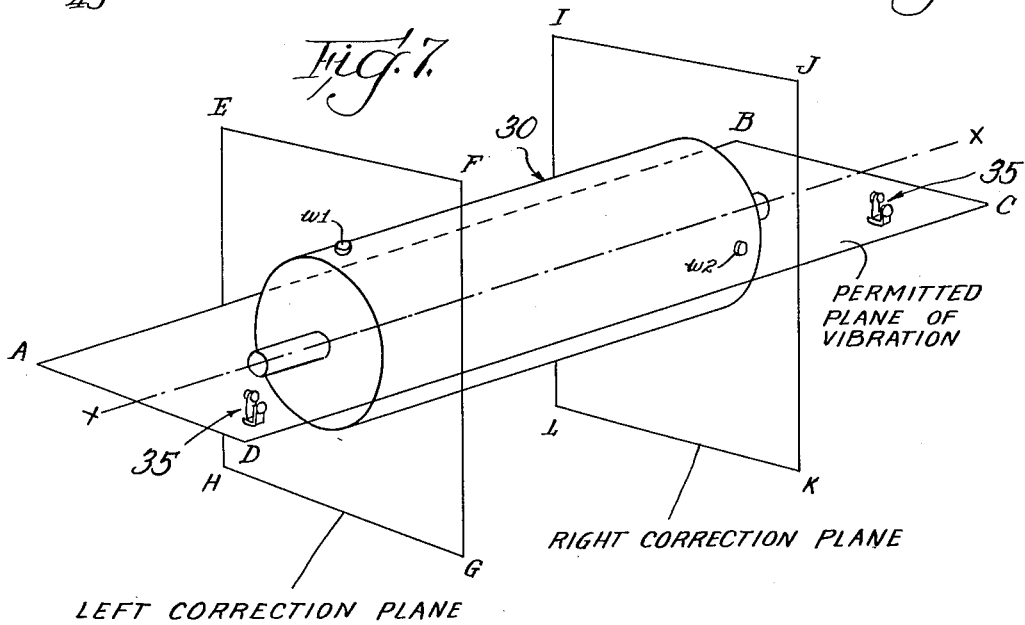
Figure 7 is a representation in perspective of a rotor mounted for balance correction, showing the plane of permissible vibrator motion, the pair of selected correction planes and the relation of my vibration responsive indicators to the rotor.

With reference to Figure 7 of the drawings, I have illustrated an unbalanced mass, in the form of a motor rotor 30 which is to be brought into balance. Such is initially rotatably mounted in a balancing mechanism, such as I have described heretofore, and as stated previously, the balancing machine permits vibrational motion of the unbalanced mass only along a restricted plane, such as that designated A, B, C, D in Figure 7. Having restricted the permissible vibratory movement of the mass to the plane A, B, C, D, herein illustrated as a horizontal plane, it will be appreciated that vibratory motions of the mass will occur entirely along and in this plane of permissible movement. Having thus mounted the rotor, or mass, it is then desirable to select a pair of correction planes, such as E, F, G, H, and I, J, K, L passing transversely through the mass and selected in parallel relation at convenient positions wherein the necessary corrections, additions or subtractions in weight will be carried on and in which the unbalancing mass of the rotor may be considered to lie, according to known practice in the art.

Further, in balancing an unbalanced mass, such as rotor 30 illustrated, it is well recognized that unbalance motion due to pure static unbalance will cause displacement of the center of gravity of the mass and all points on its axis of rotation with a translatory motion, while the unbalancing motion created by dynamic unbalance will create a rotary motion of the mass about a center of oscillation or a moment center. Further, it is recognized that a mass such as 30 may be unbalanced due to pure static unbalance, pure dynamic unbalance or some combination of the two designated types of unbalance.

Contemplating further the various motions created by the static and dynamic forces of unbalance discloses that unbalance due to purely static unbalance of a rotor, such as 30, results in motion of the rotational axis X—X of the rotor in a manner such that each point along its rotational axis, is moving in the same direction at any given instant, or in other words, all points are moving in phase. In the case of pure dynamic unbalance, points of the axis X—X on one side of the center of oscillation are moving in an opposite direction or out of phase with similar points on the opposite side of the center of oscillation. A combination of static and dynamic unbalance will cause the rotor's motion of and about the center of oscillation, so that an almost unlimited phase angle of motion or combination between motions along the axis X—X of the rotor will be encountered. Stated in other terms, it is well recognized that static unbalance implies unbalance in the same longitudinal plane and in phase while dynamic unbalance implies unbalance in the same longitudinal plane but 180° out of phase.

It is the main purpose of my present invention to disclose a means and a manner of discovering or analyzing the unbalance of a mass having unknown weight distribution, first as to unbalancing forces which are due either to static or dynamic unbalancing forces alone, say for instance first due to dynamic unbalancing forces which causes rotary motion of the mass in the selected plane of permissible movement, and then to the remaining or static unbalancing forces. Having analyzed the unbalance created by each of such component forces independently of one another, I am able to arrive at a complete balance analysis.

In order to accomplish this purpose, a vibration responsive indicator, such as indicator 35 heretofore described, is placed adjacent each end of the rotor so that such moves with the rotor across or in the plane A, B, C, D of permissible vibratory movement, as illustrated in Figure 7 of the drawings. In the particular vibration responsive indicator utilized herein, the element having the requisite zone or non-response constitutes a vibrating reed, in which the inherent plane of non-vibratory response is the plane of the reed itself. In mounting the indicator 35 the plane of the reed is preferably placed in transverse relation to the plane of permissible vibratory motion for the unbalanced mass. Provision is also made, as explained heretofore, for the rotational or pivotal movement of the reed's plane about its longitudinal axis to arrive at various angular positions thereof relative to axis X—X of the rotor 30.

Figure 8:
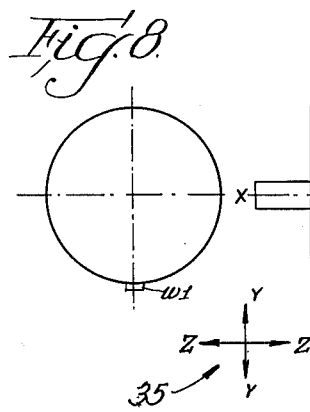
Figure 9:
Figure 10:
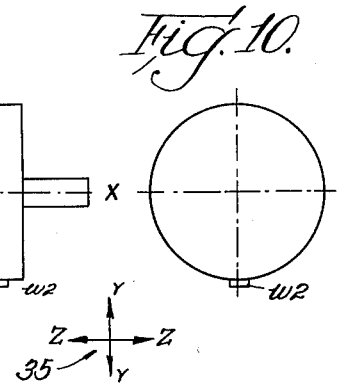

In Figures 8, 9 and 10 of the drawings, a diagrammatic representation of the rotor 30 is shown having its unbalance represented by equal mass weights W1 and W2 which lie in the same longitudinal plane of the rotor and are considered as concentrated in the two selected planes of correction to produce pure static unbalance. It will be recognized from this diagram that vibratory movement of the rotor, due to the unbalancing mass distribution, in the horizontal plane of permissible vibratory motion A, B, C, D will be that of pure parallel translation of the rotor's axis X—X across plane A, B, C, D. If the plane Y—Y of my vibration responsive indicator reed 40 is rotated so as to lie in a plane which is transverse to axis X—X of the rotor, no vibration of the reed will occur from vibratory movement of the rotor in this situation since the forces of vibration act parallel to the reed's plane Y—Y.

Consider now Figures 11, 12 and 13 of the drawings, which are similar to Figures 8, 9 and 10 with the exception that the unbalancing mass concentrations are now represented by equal weights W1 and W2 which lie on opposite sides of the rotor. It will be appreciated that the mass concentrations W1 and W2 being in the same longitudinal plane and on opposite sides of the rotor, effectively counterbalance one another to create static balance for the rotor. However, such a distribution of the masses W1 and W2 causes dynamic unbalance of the rotor or that is, from a moment couple so that upon rotation about its own axis XX the rotor will swing in an arcuate path in the permissible plane of vibratory motion A, B, C, D about some moment center or oscillation center of vibration located along the axis XX of the rotor (which center is illustrated as coinciding with the center of gravity and designated CG, in this particular instance). If the plane YY of the reed or spring 40 of my vibration responsive indicator is now rotated about its longitudinal axis so as to lie in a position which is normal to a line passing through the center of arcuate oscillation CG, created by this particular concentration of the mass weights W1 and W2, then no vibration of the reed will occur since the forces of vibration lie in or parallel to the plane of the reed itself.

From the illustrative diagrams 8—12 and the above explanation, it will be appreciated that by the use of a device having an inherent plane or zone of non-response to vibratory motion it is possible to selectively discriminate against the vibration productive forces caused by either pure static or dynamic unbalance as desired. For example, the placing of the plane YY of the vibratory indicator springs 40, as illustrated in Figure 9, effectively discriminates against all vibratory motion due to static unbalance of rotor 30. Conversely, as illustrated in Figure 12, wherein the rotor 30 is illustrated as being in static balance but dynamically unbalanced, the placing of the reed plane YY normal to a line passing through the center of moments or center of rotary oscillation of the rotor due to the dynamic unbalance thereof, will discriminate against vibration due to dynamic forces. It will be appreciated, however, that rotational adjustment of the plane YY of the reed from its Figure 9 position to a position Z—Z, parallel to the axis XX of the rotor as illustrated, would cause maximum vibration of the reed in response to static unbalance of the rotor since the static unbalance induces vibratory forces which would then act normal to the plane of the reed. Likewise, movement of the reed's plane Y—Y to a position ZZ as illustrated in Figure 12, wherein such coincides with a line passing through the center of oscillation CG, causes maximum vibration of the reed due to dynamic unbalance of the rotor 30 in the illustrated case, since again the forces of vibration are acting normal to the plane of the reed.

Utilizing these concepts and the knowledge that the angular positioning of the reed's plane or zone of non-responsiveness permits one to selectively discriminate against forces of vibration created by either static or dynamic unbalance of a given mass, one is then enabled to effectively analyze and combat the forces causing unbalance of a rotating mass as will be discussed hereinafter.

For purposes of illustrating the concepts embodied in my new mode of balancing a rotor by using a vibration responsive indicator as described heretofore, a rotor 30, as shown in Figures 14–16, is first mounted in a balancing machine of a type heretofore described whereby the movements of the rotor, other than rotational about its own longitudinal axis, are restricted to a single plane of permissible vibratory movement, preferably a horizontal plane. It will be recognized from diagram Figures 14–16, that the rotor 30 represents a typical case of combined dynamic and static unbalance wherein the unbalanced mass distribution of the rotor is represented by weights W1 and W2 portraying unbalanced mass concentrations lying in two selected planes of correction, labeled LC for left correction plane and RC for right correction plane and corresponding to planes E, F, G, H and I, J, K, L of Figure 7. It will be noted also that weights W1 and W2 do not lie in the same longitudinal plane of the rotor, but are in planes related at right angles to one another.

Having mounted the rotor in the balancing machine, as described above, and having selected the right and left correction planes, left and right vibration responsive indicators 35, which are mounted to move with the rotor in its plane of permissible vibratory movement, are set as illustrated in Figure 15 so that the plane YY of the vibratory spring or reed 40 thereof lies in normal relation to the axis XX of the rotor and projects at right angles to the plane of permissible vibratory movement (such as plane A, B, C, D of Figure 7). The stroboscope lamp 36 is also illustrated in Figure 15 with its indicator pointer 37 arranged in an operative position with the index numeral band 39 fixed to the outer surface of the rotor in a convenient manner.

After the above necessary preliminary preparations, the rotor is rotated at a desired R. P. M. resulting in its vibration motion in the horizontal plane of permissible movement. With the plane YY of the indicator's vibratory reed or spring in the position illustrated in Figure 15, effective discrimination against rectilinear translatory motion of the mass in plane A, B, C, D due to static unbalance of the rotating mass is gained, but the reed will respond to vibratory forces created by dynamic unbalance of the rotor which causes a rotation of the mass about a moment center somewhere on axis X—X.

At this stage, the right hand indicator 35 is adjusted so that its value screw 49 and the reed 40 make circuit closing contact to energize the stroboscope when the reed contacts the screw 49 exactly at the end of its arcuate swing toward the value screw as specified heretofore.

Having adjusted the right hand indicator for the desired operation of the stroboscopic lamp, a trial weight $D_1$ is then added in the right plane of correction at an angular disposition as indicated by the stroboscope. It will be recognized in this latter connection that since the plane of the rotor's permissible vibratory motion is horizontal, the addition of the trial weight will be made in this horizontal plane itself, although the stroboscope may indicate the index numeral in a plane other than the horizontal plane of vibration such as a vertical plane as illustrated. If after the addition of the trial weight, the right indicator, which has been previously adjusted for a single flash of the stroboscope at its maximum amplitude, should continue to energize the lamp 36, it will be recognized that if the trial weight $D_1$ is too great a reduction thereof should follow. If the trial weight reduces but does not eliminate the vibration of the reed of the vibration indicator then additional weight is necessary. In this connection it will be recognized that, providing the trial weight is not great enough to increase the rotors unbalance, the amplitude of the spring reed 40, after correction, will reduce in proportion to the reduction of vibration effected by the trial weight. Consequently, after noting the position of the value screw before any trial weight is added, the value screw is moved inwardly to follow the reduced amplitude of the reed thus measuring the effect of the trial weight's addition on the spring's amplitude as measured by the value screws change in indexed position.

It will be understood, of course, that the trial weight's value is proportional to the spring's change in amplitude. Therefore, noting the change of the spring's amplitude effected by the addition of the first trial weight, and knowing the remaining amplitude change necessary to reduce the same to zero, the remaining correction weight necessary to effect complete counterbalance of the dynamic unbalance component present in the right correction plane is readily determined.

Next a corrective weight is added to the left correction plane in the manner outlined above after connecting the left hand indicator for energizing the stroboscopic lamp and adjusting the left indicator so that a single flash of the stroboscope occurs at the point where the maximum swing of the vibrating reed just contacts the value screw of the left indicator as before. In this connection the value of the left hand trial or correction weight will be proportional to the value of the right hand corrective weight and can be determined readily by the number of turns the left hand indicator's value screw has been moved from the at-rest position of the left indicator's vibrating reed to its contact setting as compared to the initial contact setting of the right indicator's value screw. For example, if the value screw of the right indicator has been initially moved outwardly three turns to just make contact with the vibrating reed and the value of the total corrective weights placed in the right correction plane was three ounces, the value of the needed left hand correction weight and the number of turns on the left hand value screw to just make contact with the vibrating reed would be in the same proportion of 1 ounce to 1 turn of the screw, etc. The left hand correction weight is then added in its proper position as shown by the stroboscope to reduce the vibration of the left hand indicator's reed to zero as was done in the right hand correction plane.

Having thus reduced the vibration of the left and right hand indicators to zero, the unbalance indication thereof due to the dynamic forces acting in the two correction planes of the unbalanced rotating mass will have been counterbalanced and each correction plane will have been provided with a weight representing the counterbalancing effect for the dynamic forces causing the rotational vibratory motion of the rotating mass.

With reference to Figures 17–19, each of the indicators is next rotated about its longitudinal axis until the plane Y—Y of each vibrating spring 40 is positioned for maximum response to static unbalance of the rotor. In this condition the value screw of the right indicator is first adjusted so that a single flash of the stroboscopic lamp occurs at the end of the vibrating spring's arcuate path as before in balancing out the dynamic forces in the right hand plane. The value of the trial weight will be indicated by the number of turns of the value screw of the right indicator as before with such being in the same proportion to the number of turns of the value screw as the dynamic trial weight $D_1$ was to the similar setting of the value screw found in indicating the dynamic unbalance in the right hand correction plane. The angular position of the unbalance will be indicated by the stroboscope as before, and a correction weight $S_1$ is accordingly placed in the right hand correction plane. Thus vibration due to static forces in the right correction plane is eliminated and the same process is repeated in the left correction plane, with a weight $S_2$ being added therein for combatting the unbalancing static forces present in the left correction plane. Relative to these latter steps it will be recognized that having previously eliminated or counterbalanced the dynamic unbalancing forces present in the two correction planes as described above, the positioning of the indicator planes YY as shown in Figure 18 will indicate only unbalance due to static forces.

As a result of the above balancing operations two trial or correction weights will have been added in each correction plane, one representing counterbalance for static forces and the other representing the counterbalance for dynamic forces. The rotor is then in complete balance since it is in both static and dynamic balance.

In diagram Figure 20 it will be observed that such is a composite superposed vector analysis of the unbalancing forces present at both ends of the rotor of Figure 15 having unbalancing masses W1 and W2 disposed at its opposite ends and in planes 90° apart. It is known that static unbalance of a rotating mass may be completely corrected in one or more longitudinal planes of the mass while the dynamic unbalance must be corrected in two longitudinal planes of the mass and at points diametrically opposite. Referring to diagram, Figure 20, let the vector marked "R static" indicate the total resultant static unbalance caused by weights W1 and W2. By adding a corrective weight in each of the selected left and right hand corrective planes equal to one-half of the value of the static vector R-static and diametrically opposite the arrowhead thereon as shown by vector $S_1$ of Figure 20, complete static balance will be obtained. However, it will be noted that while the pair of static correction weights S–1, S–2, each equal in value to one-half of the total static unbalance, produce complete static balance, such static correction weights are not diametrically opposite the original unbalance weights W–1 or W–2. Therefore, upon rotation of the mass or rotor a dynamic couple will be formed equal in value and position to the resultant of each pair of weights in each correction plane. That is to say, the couple force in each correction plane will be equal to the resultant of the weights W–1 with S–1 or W–2 with S–2, one the original unbalance weight in that plane and the other the one half value static correction weight. The resultant of these weights define the value and position of the dynamic unbalance in each correction plane, as shown at D2 and D1, Figure 20 of the drawings; D2 being equal and opposite the resultant of S–2 with W–2, and D–1 being equal and opposite the resultant of S–1 with W–1. In this regard note that there is a static correction weight in each correction plane of equal value labeled S1 and S2 (each equal to one half of R static) with weight S2 not being shown in Figure 20. It will now be seen from Figure 20 that D–1 and S–1 may be resolved to give a resultant weight exactly equal and opposite to the original unbalance W–1. Likewise, weight D–2 and S–2 may be combined to give a resultant exactly equal and opposite to the original unbalance weight W–2, thus effecting complete static and dynamic balance with the latter two mentioned resultant values being positioned in each plane of correction to effect complete balance. It will be observed that by such steps each correction plane will have been provided with two correction weights as was accomplished in my balancing method described above. The resultant value of these two weights in each correction plane will equal the actual value of the original unbalance in each plane at points diametrically opposite weights W1 and W2 (see Figures 17 and 19). It is therefore obvious that the pair of correction weights added in each correction plane of the rotor according to my balancing steps outlined previously, may be replaced by a single weight equal to the resultant value, if desired as weights $R_{w1}$ and $R_{w2}$ of Figures 17 and 19. This latter step may be accomplished by removing the pair of corrective weights from one correction plane, say the right hand correction plane, and setting the reed plane YY of the right hand vibration indicator to indicate maximum static unbalance, i. e. parallel to axis X—X of the rotor. The rotation of the rotor will then cause the right hand indicator to vibrate indicating the resultant value of the only unbalance present in the rotor which is that value just removed from the right correction plane. The value of the single resultant correction will be determined again by the setting of the value screw of the right hand indicator and the angular disposition thereof by the stroboscopic lamp according to the practice outlined previously. If the same operation is repeated in the left hand correction plane, the pair of correction weights in that plane may likewise be replaced with a single resultant corrective weight.

It should be noted that my method of balancing the rotor, utilizing a vibration responsive indicator having an inherent plane of non-responsiveness to vibratory forces, is especially adapted for utilization in production line setups where a large number of similar rotors or masses are to be balanced. For such an operation the first rotor of the run is balanced as described hereabove by separately and successively correcting for first the total dynamic unbalancing forces and then the static unbalancing forces in the two selected correction planes. With this first rotor thus balanced, if the correction weights in the right hand plane are then removed and the reed's plane YY of the left hand indicator set as shown in Figure 12 of the drawings, so that such lies in normal relation to a line passing through the rotor's center of vibratory oscillation, the left hand indicator will be set for zero response to unbalance in the right hand correction plane. Similarly, if the plane YY of the right hand indicator is set after the removal of the correction weights from the left hand correction plane so that it gives a zero response to vibration or lies in normal relation to a line passing through the center of oscillation, the right hand indicator will then be in a position to give zero response to unbalance in the left hand correction plane. With the indicators thus set to give zero response for unbalance in each of the two selected correction planes, but to be responsive to unbalance in all other planes of correction, if an unbalanced rotor of a similar nature is then mounted in the balancing machine with the indicators thus set, the right hand indicator in conjunction with its value screw and the stroboscopic lamp will indicate directly the value and angular position of a single correction weight to be placed in the right hand correction plane to bring the rotor to balance in that plane. Similarly the left hand indicator and stroboscope will indicate the value and angular position for a single corrective weight for the left hand correction plane. The value of the correction weights will, of course, be determined by the value screw settings which will be proportional to the value screw settings for the initially balanced item. Thus a quick and accurate production line balancing system is provided.

Obviously, it will be understood that if perchance a rotor mass is encountered which is balanced statically, but dynamically unbalanced the positioning of the vibration indicators so as to discriminate against static balance will indicate the amount of dynamic unbalance to be counteracted in the selected correction planes as described above, and the second step of discriminating against dynamic unbalance for the determination of the static unbalance in the correction planes will thus be eliminated. Conversely, if the rotor is merely statically unbalanced there will be no correction for its dynamic unbalance. As described above, where the rotor is both dynamically and statically unbalanced a pair of correction weights will be placed normally in each of the selected planes of correction which may then be replaced with a single resultant weight to bring the rotor into final balance. Also, instead of adding weights to the rotor, the equivalent weight may be removed from the rotor at a position diametrically opposite the additive corrective weights with the same effect, according to practice familiar in the art.

It will thus be observed that I have provided a new and improved method and means for determining the individual dynamic and static components going to make up the combined unbalance of a mass of undetermined weight distribution characteristics, which is simpler and more accurate than prior systems and devices heretofore known in the art which seek to directly counteract the combined effects of these forces by trial and error. By my method and the utilization of a vibration responsive device having an inherent plane or zone of non-response to vibratory forces, I am enabled to selectively discriminate against the two types of unbalancing forces, namely, static and dynamic unbalance, to the end that each of these factors may be independently determined, one at a time, and eliminated to bring the unbalanced mass into complete balance. Further, it will be recognized that having once balanced the initial item in a run of a number of similar masses or items the setting of the vibration responsive indicator to a position, lying normal to a line passing through the center of unbalance oscillation of the mass, permits a quick and accurate balancing of successive masses or items of a similar character.

Further, it will be appreciated that while I have herein disclosed one type of balancing machine and one type of vibration responsive indicator, the latter of which embodies a vibratory reed having an inherent plane of non-responsiveness to vibration forces, other balancing machines are readily adapted for use with a vibration responsive device of this character or of related character wherein a zone or plane of non-response to vibrational motions is inherently contained therein. Further, although I have shown and described one embodiment in which the features of my new and improved vibration responsive device may occur and by which my new and improved method of balancing a mass of unknown weight distribution characteristics may be accomplished, it will be appreciated that I do not wish to be limited to the specific embodiment herein disclosed except as may appear in the following appended claims.

I claim:

1. In combination, a carriage member for mounting a rotor to be analyzed for unbalance, suspension means supporting said carriage member in a manner limiting the same to move freely with said rotor in a single plane of permissible vibratory motion, a flexible planar reed member, mounting means at one end of said reed member, pivotal means connecting said mounting means to said carriage member such that said reed member is rotatably adjustable about its own longitudinal axis at a point displaced from the rotational axis of said rotor, said reed member being unresponsive to vibrational forces acting in and parallel to its own plane of formation, adjustable contact means movable toward and away from the plane of said reed member for measuring the vibrational amplitude of said reed member, and stroboscopic means in circuit with said adjustable contact means and reed member for indicating the angular disposition of unbalanced forces acting on said rotor and causing said reed member to vibrate, said stroboscopic means being energized upon engagement of said reed member with said contact means.

2. A vibration responsive indicator for use in a balance testing machine of the type having support means for a rotor which defines therefor a single plane of permissible vibratory motion, comprising, a vibrational responsive member having an inherent plane of zero response to vibrational forces disposed with such plane transverse to said single plane, means pivotally connecting said member to the rotor support means at a location displaced from the normal rotational axis of the rotor so that said member is movable with said rotor and support means in said single plane and including means for adjusting the angular disposition of said member's plane of zero response with respect to the longitudinal axis of the rotor; means adjacent said member for measuring its vibrational amplitude as caused by its response to vibrational movement of the rotor, the last named means forming an electrical switch with said member, and electrical means in circuit with such switch for indicating the angular position of unbalanced forces in said rotor which are causing said member to vibrate.

3. A vibration responsive indicator for use in a balance testing machine of the type having support means for the rotor which defines therefor a single plane of permissible movement of free vibratory motion, comprising, a vibrational responsive reed member having an inherent plane of formation which is unresponsive to vibrational forces, means pivotally connecting said reed member at one end to the rotor support means with its plane of formation normal to said single plane and at a location displaced from the normal rotational axis of the rotor so that said reed member is moveable with said rotor and support means in and across said single plane and including means for adjustably rotating said reed member about its pivotal axis thereby to regulate the annular disposition of the reed member's plane of zero response with respect to the rotational axis of the rotor, adjustable screw means adjacent said reed member for measuring the latter's vibrational amplitude as caused by its response to vibrational movement of the rotor in said plane, said adjustable screw means forming an electrical switch contact system with said reed member, and stroboscopic means in circuit with said adjustable screw means and reed member for indicating the angular position of unbalance forces acting in said rotor to cause said reed member to vibrate.

4. For use in a balance testing machine having means for supporting a rotor to be analyzed for free vibratory motion in a single plane, an indicator means comprising, a frame member, a pivot member extending from said frame member for rotatable connection to the rotor's support means at a position displaced from the rotational axis of said rotor such that said frame is pivotal about an axis normal to said plane, a planar reed free at one end and connected at its opposite end with said frame and pivot member so that its plane of formation lies normal to said single plane, a graduated screw means threadingly movable through said frame member normal to the plane of said reed, adjustment means for arresting said reed with its plane at various angular positions relative to the rotational axis of the rotor, and a stroboscopic means in circuit with said reed and screw means such that energization thereof is controlled by contacting engagement of said reed with said screw means; such indicator means being capable of discriminating selectively against either dynamic or static unbalance forces causing the rotor to vibrate in said single plane by selectively adjusting the plane of said reed parallel to the direction of the effective vectors representing such forces.

References Cited in the file of this patent

UNITED STATES PATENTS

| | | |
|---|---|---|
| 209,475 | Harris | Oct. 29, 1878 |
| 2,050,073 | Thearle | Aug. 4, 1936 |
| 2,165,024 | Baker et al. | July 4, 1939 |
| 2,301,291 | Kolesnik | Nov. 10, 1942 |
| 2,328,114 | Weaver et al. | Aug. 31, 1943 |
| 2,405,474 | Van Degrift | Aug. 6, 1946 |
| 2,426,305 | Hope | Aug. 26, 1947 |
| 2,451,863 | Oakley | Oct. 19, 1948 |
| 2,594,581 | Phelps | Apr. 25, 1952 |

FOREIGN PATENTS

| | | |
|---|---|---|
| 700,613 | Germany | Dec. 24, 1940 |